United States Patent
Shin et al.

(12) United States Patent
(10) Patent No.: US 11,962,168 B2
(45) Date of Patent: Apr. 16, 2024

(54) WIRELESS CHARGING DEVICE

(71) Applicant: LG CHEM, LTD., Seoul (KR)

(72) Inventors: Jong Min Shin, Daejeon (KR); Dong Woo Yoo, Daejeon (KR); Jin Kyu Lee, Daejeon (KR)

(73) Assignee: LG Chem, LTD., Seoul (KR)

( * ) Notice: Subject to any disclaimer, the term of this patent is extended or adjusted under 35 U.S.C. 154(b) by 505 days.

(21) Appl. No.: 17/275,718

(22) PCT Filed: Sep. 30, 2019

(86) PCT No.: PCT/KR2019/012746
§ 371 (c)(1),
(2) Date: Mar. 12, 2021

(87) PCT Pub. No.: WO2020/067838
PCT Pub. Date: Apr. 2, 2020

(65) Prior Publication Data
US 2022/0060058 A1    Feb. 24, 2022

(30) Foreign Application Priority Data
Sep. 28, 2018    (KR) .................. 10-2018-0115970

(51) Int. Cl.
*H02J 50/70* (2016.01)
*H01F 27/00* (2006.01)
*H01F 27/36* (2006.01)
*H02J 50/12* (2016.01)

(52) U.S. Cl.
CPC ........... *H02J 50/70* (2016.02); *H01F 27/366* (2020.08); *H02J 50/12* (2016.02)

(58) Field of Classification Search
CPC ......... H02J 50/70; H02J 50/12; H01F 27/366
USPC ................... 320/108, 109, 113, 115
See application file for complete search history.

(56) References Cited

U.S. PATENT DOCUMENTS

| | | | |
|---|---|---|---|
| 7,632,565 B1 | 12/2009 | Imam et al. | |
| 9,178,376 B2 * | 11/2015 | Jung | H02J 50/005 |
| 2005/0205848 A1 | 9/2005 | Kamiya et al. | |
| 2011/0140653 A1 * | 6/2011 | Jung | H02J 7/0016 320/108 |
| 2011/0285486 A1 | 11/2011 | Maeda et al. | |
| 2014/0141232 A1 | 5/2014 | Hong et al. | |
| 2018/0162098 A1 | 6/2018 | Joo | |
| 2020/0328025 A1 * | 10/2020 | Faraji | H01F 27/363 |
| 2021/0199835 A1 * | 7/2021 | Hirani | H01F 27/36 |
| 2021/0259143 A1 * | 8/2021 | Shin | H05K 9/0084 |

FOREIGN PATENT DOCUMENTS

| | | |
|---|---|---|
| CN | 103841811 A | 6/2014 |
| CN | 106801159 A | 6/2017 |
| EP | 2521143 B1 | 6/2015 |
| JP | 2001527656 A | 12/2001 |
| JP | 2002198684 A | 7/2002 |
| JP | 2005307336 A | 11/2005 |
| JP | 2009272500 A | 11/2009 |
| KR | 200338459 Y1 | 1/2004 |
| KR | 1020050113937 A | 12/2005 |
| KR | 101552425 B1 | 9/2015 |
| KR | 1020160124273 A | 10/2016 |
| KR | 20180062170 A | 6/2018 |
| WO | 9848948 A1 | 11/1998 |
| WO | 2010084812 A1 | 7/2010 |
| WO | 2018087076 A1 | 5/2018 |
| WO | 2018101712 A1 | 6/2018 |
| WO | WO-2018101712 A1 * | 6/2018 ............ B22F 1/0059 |

OTHER PUBLICATIONS

Extended European Search Report corresponding to PCT/KR2019/012746; dated Oct. 21, 2021 (8 pages).
First Office Action corresponding to European Application No. 19867167.9 dated May 11, 2023 (8 pages).
International Search Report corresponding to PCT/KR2019/012746; dated Jan. 31, 2020 (5 pages, including English translation).

* cited by examiner

Primary Examiner — Phallaka Kik
(74) Attorney, Agent, or Firm — SALIWANCHIK, LLOYD & EISENSCHENK

(57) ABSTRACT

Wireless charging devices and wireless charging systems are provided. The wireless charging devices may include a receiving part coil and an electromagnetic-wave shielding sheet on the receiving part coil. The electromagnetic-wave shielding sheet may have a specific magnetic permeability of 100 or greater from 100 khz to 300 khz and may include a metal foam including a soft magnetic metal component.

19 Claims, No Drawings

WIRELESS CHARGING DEVICE

CROSS-REFERENCE TO RELATED APPLICATIONS

This application is a 35 U.S.C. § 371 national stage application of PCT International Application No. PCT/KR2019/012746, filed Sep. 30, 2019, which claims priority from Korean Patent Application No. 10-2018-0115970, filed Sep. 28, 2018, the contents of which are incorporated herein in their entireties by reference. The above-referenced PCT International Application was published in the Korean language as International Publication No. WO2020/067838 on Apr. 2, 2020.

TECHNICAL FIELD

The present application relates to a wireless charging device and a wireless charging system comprising the same.

Background Art

Materials having high magnetic permeability can be used for various applications. For example, such a material can be used in various devices or materials including an EMC core, a low-power high-inductance resonance circuit or a broadband transformer, and the like, and can also be used as a wave absorber. The wave absorber is applied to a wireless charging device of a conductive material such as an electronic device or a mobile display.

Typically, a material in the form of a polymer composite material film prepared by rolling a metal having high magnetic permeability or using metal particles as a filler is used as the material having high magnetic permeability.

However, in the method such as rolling, there are problems that the process is complicated and the price is high, because a multicomponent material is used or the crystallization is performed on the film, in order to increase the magnetic permeability of the metal material.

In addition, when the metal particles are used as the filler, the amount of the metal particles should be increased in order to secure high magnetic permeability, and in this case, the film is less flexible, where there may also be a problem in the electrically insulating part.

DISCLOSURE

Technical Problem

The present application relates to a wireless charging device. It is one object of the present application to provide a wireless charging device having high magnetic permeability and having improved electromagnetic-wave shielding performance and wireless charging efficiency.

Technical Solution

The present application relates to a wireless charging device. In the present application, the wireless charging device may mean a material that can be charged wirelessly. The wireless charging device may comprise a receiving part coil and an electromagnetic-wave shielding sheet positioned on the receiving part coil. The electromagnetic-wave shielding sheet may exhibit specific magnetic permeability of 100 or more at 100 kHz to 300 kHz. In addition, the electromagnetic-wave shielding sheet may comprise a metal foam including a soft magnetic metal component. The metal foam included in the electromagnetic-wave shielding sheet according to the present application may provide a material having high magnetic permeability by multiple reflection and absorption, and the like due to its unique surface area and pore characteristics, and through application of the metal foam, it can ensure excellent mechanical strength and flexibility in the electromagnetic-wave shielding sheet. In addition, as is described below, the metal foam of the present application may further comprise a polymer component present on the surface of the metal foam or inside the metal foam, where the complexation with the polymer component can ensure oxidation and high temperature stability, electrical insulation, and the like, and can also solve peeling problems and the like caused at the time of being included in various devices. The electromagnetic-wave shielding sheet of the present application can also be produced through a simple and economic process.

The present application also relates to a wireless charging system. The wireless charging system may comprise a wireless charger including a transmitting part coil and the wireless charging device disposed on the wireless charger. The magnetic field generated in the transmitting part coil of the wireless charger causes an inductive current to flow in the receiving part coil, and the wireless charging system of the present application has a principle of storing it.

In an embodiment of the present application, the receiving part coil included in the wireless charging device and the transmitting part coil of the wireless charger may use a known material. The above-described electromagnetic-wave shielding sheet may be present on the receiving part coil, and the transmitting part coil may be disposed below the receiving part coil. In addition, the wireless charging device may further comprise a conductive material located on the electromagnetic-wave shielding sheet. The electromagnetic-wave shielding sheet serves to prevent transmission of the magnetic field generated from a wireless power transmitting part toward the direction of the conductive material. The conductive material may be an electronic device such as a battery or a mobile display, and may be a material that is subject to wireless charging.

The inductive current flows in the receiving part coil due to the magnetic field generated from the transmitting part coil of the wireless charger, and thus the wireless charging device of the present application has a principle of storing the same. In the above process, the inductive current flows in the conductive material located on the electromagnetic-wave shielding sheet due to the magnetic field generated from the transmitting part coil, which generates a magnetic field in the reverse direction of the magnetic field of the transmitting part, and when both are offset by each other, the wireless charging efficiency decreases rapidly, so that in order to prevent this, the electromagnetic-wave shielding sheet is located between the transmitting part coil and the conductive material. The electromagnetic-wave shielding sheet is operated in a manner of looping the direction so that the magnetic flux generated from the transmitting part coil does not go to the conductive material, and accordingly, the electromagnetic-wave shielding sheet according to the present application implements efficient wireless charging.

In this specification, the term metal foam or metal skeleton means a porous structure comprising a metal as a main component. Here, the fact that the metal is used as a main component means a case where the ratio of the metal is 55 wt % or more, 60 wt % or more, 65 wt % or more, 70 wt % or more, 75 wt % or more, 80 wt % or more, 85 wt % or more, 90 wt % or more, or 95 wt % or more based on the total weight of the metal foam or the metal skeleton. The upper limit of the ratio of the metal contained as the main component is not particularly limited, which may be, for example, 100 wt %, 99 wt %, or 98 wt % or so.

In this specification, the term porousness may mean a case where it has a porosity of at least 10% or more, 20% or more, 30% or more, 40% or more, 50% or more, 60% or more, 70% or more, 75% or more, or 80% or more. The upper limit of the porosity is not particularly limited, which may be, for example, less than about 100%, about 99% or less, about 98% or less, about 95% or less, about 90% or less, about 85% or less, 80% or less, or about 75% or less or so. The porosity can be calculated in a known manner by calculating the density of the metal foam or the like.

Among physical properties mentioned in this specification, when the measured temperature affects the relevant physical property, the physical property is measured at room temperature, unless otherwise specified. The term room temperature is a natural temperature without warming or cooling, which may mean, for example, a temperature in a range of about 10° C. to about 30° C., or a temperature of about 23° C. or about 25° C. or so.

The form of the metal foam included in the electromagnetic-wave shielding sheet of the present application is not particularly limited, but in one example, it may be in a film or sheet shape. In the electromagnetic-wave shielding sheet of the present application, a polymer component existing on the surface of or inside the metal foam in the form of a film or sheet may be added.

Such a polymer component may form a surface layer on at least one surface of the metal foam or may be filled in voids inside the metal foam and present, and in some cases, it may also be filled inside the metal foam while forming the surface layer. In the case of forming a surface layer, the polymer component may form the surface layer on at least one surface, some surfaces, or all surfaces among surfaces of the metal foam. In one example, the polymer component may form the surface layer on at least the upper and/or lower surfaces, which are the main surfaces of the metal foam. The surface layer may be formed to cover the entire surface of the metal foam, or may also be formed to cover only a part of the surface.

In the electromagnetic-wave shielding sheet, the metal foam may have a porosity of about 10% or more. The metal foam having this porosity has a porous metal framework forming a suitable network, and thus it can ensure high magnetic permeability even if a small amount of the relevant metal foam is applied. In another example, the porosity may be 15% or more, 20% or more, 25% or more, 30% or more, 35% or more, 40% or more, 45% or more, 50% or more, 55% or more, 60% or more, 65% or more, or 70% or more, or may be 99% or less, 98% or less, about 95% or less, about 90% or less, 85% or less, about 80% or less, or about 75% or less or so.

The pore characteristics of the metal foam can be further controlled to ensure proper magnetic permeability and the like. For example, the metal foam may include approximately spherical, needle or random shape pores. For example, the metal foam may have a maximum pore size of about 50 μm or less, 45 μm or less, 40 μm or less, 35 μm or less, or 30 μm or less or so. In another example, the maximum pore size may be about 2 μm or more, 4 μm or more, 6 μm or more, 8 μm or more, 10 μm or more, 12 μm or more, 14 μm or more, 16 μm or more, 18 μm or more, 20 μm or more, 22 μm or more, 24 μm or more, or 26 μm or more.

On the other hand, in the metal foam, 85% or more pores of the whole pores of the metal foam may have a pore size of 10 μm or less and 65% or more pores may have a pore size of 5 μm or less. Here, the lower limit of the pore size of the pores having a pore size of 10 μm or less or 5 μm or less is not particularly limited, but in one example, the pore size may be more than about 0 μm, 0.1 μm or more, 0.2 μm or more, 0.3 μm or more, 0.4 μm or more, 0.5 μm or more, 0.6 μm or more, 0.7 μm or more, 0.8 μm or more, 0.9 μm or more, 1 μm or more, 1.1 μm or more, 1.2 μm or more, 1.3 μm or more, 1.4 μm or more, 1.5 μm or more, 1.6 μm or more, 1.7 μm or more, 1.8 μm or more, 1.9 μm or more, or 2 μm or more.

Also, here, the pores having a pore size of 10 μm or less of the whole pores may be 100% or less, 95% or less, or 90% or less or so, and the ratio of the pores having a pore size of 5 μm or less may be 100% or less, 95% or less, 90% or less, 85% or less, 80% or less, 75% or less, or 70% or less or so.

The desired electromagnetic-wave shielding sheet can be produced by this pore distribution or characteristic. For example, when the electromagnetic-wave shielding sheet or metal foam is in the form of a film, the pore distribution may be determined based on the major axis direction of the film.

As described above, the metal foam may be in the form of a film. In this case, the thickness of the film can be adjusted in consideration of the desired thermal conductivity or thickness ratio, and the like, in manufacturing an electromagnetic-wave shielding sheet according to a method to be described below. In order to ensure the target thermal conductivity, the thickness of the film may be, for example, about 5 μm or more, about 10 μm or more, about 20 μm or more, about 30 μm or more, about 40 μm or more, about 45 μm or more, about 50 μm or more, about 55 μm or more, about 60 μm or more, about 65 μm or more or about 70 μm or more, 75 μm or more, 80 μm or more, 85 μm or more, 90 μm or more, 95 μm or more, 100 μm or more, 105 μm or more, 110 μm or more, or 115 μm or more. The upper limit of the thickness of the film is controlled according to the purpose, which is not particularly limited, but may be, for example, about 1,000 μm or less, about 900 μm or less, about 800 μm or less, about 700 μm or less, about 600 μm or less, about 500 μm or less, about 400 μm or less, about 300 μm or less, about 200 μm or less or about 150 μm or less, 130 μm or less, 120 μm or less, 110 μm or less, 100 μm or less, or 90 μm or less or so.

In this specification, when the thickness of the relevant target is not constant, the thickness may be a minimum thickness, a maximum thickness or an average thickness of the target.

The metal foam may be a metal foam of a soft magnetic metal component. The term soft magnetic metal component is a soft magnetic metal or metal alloy, where the definition of soft magnetism is as known in the industry. Here, the metal foam of a soft magnetic metal component may be composed of only a soft magnetic metal component or may mean a metal foam containing the metal component as a main component. Accordingly, the metal foam may comprise the soft magnetic metal component in an amount of 55 wt % or more, 60 wt % or more, 65 wt % or more, 70 wt % or more, 75 wt % or more, 80 wt % or more, 85 wt % or more, 90 wt % or more, or 95 wt % or more based on the total weight. The upper limit of the ratio of the soft magnetic metal component is not particularly limited, which may be, for example, 100 wt %, 99 wt % or 98 wt % or so.

An example of specific soft magnetic metal components, which can be applied, can be exemplified by an Fe/Ni alloy, an Fe/Ni/Mo alloy, an Fe/Al/Si alloy, an Fe/Si/B alloy, an Fe/Si/Nb alloy, an Fe/Si/Cu alloy or an Fe/Si/B/Nb/Cu alloy, and the like, but is not limited thereto. Here, Fe means iron, Ni means nickel, Mo means molybdenum, Al means aluminum, Si means silicon, B means boron, Nb means niobium, and Cu means copper. However, in the present application, various materials known to have soft magnetism may be applied in addition to the material.

In an embodiment of the present application, the metal foam may comprise a first metal component and a second metal component having lower electrical conductivity than that of the first metal component. The second metal component is not particularly limited as long as it is a material having lower electrical conductivity or higher thermal resistance than that of the first metal component. The first metal component or the second metal component may be a soft magnetic metal component, but is not limited thereto. In addition, the second metal component may be included in a range of at least 0.01 to 30 wt %, 3 to 28 wt %, 4 to 27 wt % or 4.5 to 25 wt % in the metal foam. Alternatively, the second metal component may be included in an amount of 0.01 to 50 parts by weight, 0.1 to 45 parts by weight or 1 to 43 parts by weight relative to 100 parts by weight of the first metal component. In general, when the magnetic permeability is high, a metal component having high electrical conductivity and low specific resistance is included in terms of high electromagnetic-wave shielding performance and wireless charging efficiency, but in the case of a material having high electrical conductivity even if the magnetic permeability is high, the magnetic flux in the reverse direction caused by the eddy current is generated to offset the magnetic field, thereby degrading the wireless charging efficiency. Therefore, the electromagnetic-wave shielding sheet of the present application can improve wireless charging efficiency by using the specific metal foam.

In one example, the second metal component may comprise Mo, Si, B, Cr, Co or Nb, but is not limited thereto, and other known metal components may be used.

Various methods for producing the metal foam are known. In the present application, metal foams manufactured by such a known method can be applied.

As a method for preparing a metal foam, a method of sintering a pore-forming agent such as a salt and a composite material of a metal, a method of coating a metal on a support such as a polymer foam and sintering it in this state or a slurry method, and the like is known. Furthermore, the metal foam can also be produced by a method disclosed in Korean Patent Application No. 2017-0086014, 2017-0040971, 2017-0040972, 2016-0162154, 2016-0162153 or 2016-0162152, and the like, which is a prior application of the present applicant.

In one example, the metal foam of the present application may comprise a step of sintering a metal foam precursor comprising the soft magnetic metal component. In the present application, the term metal foam precursor means a structure before the process which is performed to form a metal foam, such as the sintering, that is, a structure before the metal foam is generated. In addition, even if the metal foam precursor is referred to as a porous metal foam precursor, it is not necessarily porous by itself, and it can be referred to as a porous metal foam precursor for convenience, as long as it can finally form a metal foam, which is a porous metal structure.

In the present application, the metal foam precursor may be formed using a slurry comprising at least a metal component, a dispersant and a binder.

Here, as the metal component, a metal powder can be applied. An example of the applicable metal powder is determined depending on the purpose, which is not particularly limited, and a powder of a metal or a powder of a metal alloy or a powder of a metal mixture, which is capable of forming the above-described soft magnetic metal component, can be applied.

The size of the metal powder is also selected in consideration of the desired porosity or pore size, and the like, which is not particularly limited, but for example, the metal powder may have an average particle diameter in a range of about 0.1 µm to about 200 µm. In another example, the average particle diameter may be about 0.5 µm or more, about 1 µm or more, about 2 µm or more, about 3 µm or more, about 4 µm or more, about 5 µm or more, about 6 µm or more, about 7 µm or more, or about 8 µm or more. In another example, the average particle diameter may be about 150 µm or less, 100 µm or less, 90 µm or less, 80 µm or less, 70 µm or less, 60 µm or less, 50 µm or less, 40 µm or less, 30 µm or less, or 20 µm or less. As the metal in the metal particles, those having different average particle diameters may also be applied. The average particle diameter can be appropriately selected in consideration of the shape of the desired metal foam, for example, the thickness or the porosity of the metal foam.

Here, the average particle diameter of the metal powder can be obtained by a known particle size analysis method, and for example, the average particle diameter may be a so-called D50 particle diameter.

The ratio of the metal component (metal powder) in such a slurry is not particularly limited, which can be selected in consideration of the desired viscosity, process efficiency, and the like. In one example, the ratio of the metal component in the slurry may be 0.5 to 95% or so based on weight, but is not limited thereto. In another example, the ratio may be about 1% or more, about 1.5% or more, about 2% or more, about 2.5% or more, about 3% or more, about 5% or more, 10% or more, 15% or more, 20% or more, 25% or more, 30% or more, 35% or more, 40% or more, 45% or more, 50% or more, 55% or more, 60% or more, 65% or more, 70% or more, 75% or more, or 80% or more, or may be about 90% or less, about 85% or less, about 80% or less, about 75% or less, about 70% or less, about 65% or less, 60% or less, 55% or less, 50% or less, 45% or less, 40% or less, 35% or less, 30% or less, 25% or less, 20% or less, 15% or less, 10% or less, or 5% or less or so.

The metal foam precursor may be formed using a slurry comprising a dispersant and a binder together with the metal powder.

Here, as the dispersant, for example, an alcohol may be applied. As the alcohol, a monohydric alcohol with 1 to 20 carbon atoms such as methanol, ethanol, propanol, pentanol, octanol, ethylene glycol, propylene glycol, pentanol, 2-methoxyethanol, 2-ethoxyethanol, 2-butoxyethanol, glycerol, texanol or terpineol, or a dihydric alcohol with 1 to 20 carbon atoms such as ethylene glycol, propylene glycol, hexanediol, octanediol or pentanediol, or a higher polyhydric alcohol, and the like may be used, but the kind is not limited to the above.

The slurry may further comprise a binder. The kind of such a binder is not particularly limited, which may be appropriately selected depending on the kind of the metal component, or dispersant applied upon producing the slurry. For example, the binder can be exemplified by an alkylcellulose having an alkyl group with 1 to 8 carbon atoms such as methylcellulose or ethylcellulose, a polyalkylene carbonate having an alkylene unit with 1 to 8 carbon atoms such as polypropylene carbonate or polyethylene carbonate, or a polyvinyl alcohol-based binder (hereinafter, may be referred to as a polyvinyl alcohol compound) such as polyvinyl alcohol or polyvinyl acetate, and the like, but is not limited thereto.

The ratio of each component in such a slurry is not particularly limited. Such a ratio can be adjusted in consideration of the process efficiency such as coating property and moldability at the time of performing the process using the slurry.

For example, the binder may be contained in the slurry at a ratio of about 1 to 500 parts by weight relative to 100 parts by weight of the above-described metal component. In another example, the ratio may be about 2 parts by weight or more, about 3 parts by weight or more, about 4 parts by weight or more, about 5 parts by weight or more, about 6 parts by weight or more, about 7 parts by weight or more, about 8 parts by weight or more, about 9 parts by weight or more, about 10 parts by weight or more, about 20 parts by weight or more, about 30 parts by weight or more, about 40 parts by weight or more, about 50 parts by weight or more, about 60 parts by weight or more, about 70 parts by weight or more, about 80 parts by weight or more, about 90 parts by weight or more, about 100 parts by weight or more, about 110 parts by weight or more, about 120 parts by weight or more, about 130 parts by weight or more, about 140 parts by weight or more, about 150 parts by weight or more, about 200 parts by weight or more, or about 250 parts by weight or more, and may be about 450 parts by weight or less, about 400 parts by weight or less, about 350 parts by weight or less, about 300 parts by weight or less, about 250 parts by weight or less, about 200 parts by weight or less, about 150 parts by weight or less, about 100 parts by weight or less, about 50 parts by weight or less, about 40 parts by weight or less, about 30 parts by weight or less, about 20 parts by weight or less, or about 10 parts by weight or less.

The dispersant may be included in the slurry at a ratio of about 10 to 2,000 parts by weight relative to 100 parts by weight of the binder. In another example, the ratio may be about 20 parts by weight or more, about 30 parts by weight or more, about 40 parts by weight or more, about 50 parts by weight or more, about 60 parts by weight or more, about 70 parts by weight or more, about 80 parts by weight or more, about 90 parts by weight or more, about 100 parts by weight or more, about 200 parts by weight or more, about 300 parts by weight or more, about 400 parts by weight or more, about 500 parts by weight or more, about 550 parts by weight or more, about 600 parts by weight or more, or about 650 parts by weight or more, and may be about 1,800 parts by weight or less, about 1,600 parts by weight or less, about 1,400 parts by weight or less, about 1,200 parts by weight or less, or about 1,000 parts by weight or less.

Unless otherwise specified, the unit weight part herein means a weight ratio between the respective components.

The slurry may further comprise a solvent, if necessary. However, according to one example of the present application, the slurry may not comprise the solvent. As the solvent, a suitable solvent may be used in consideration of solubility of the components of the slurry, for example, the metal component or the binder, and the like. For example, as the solvent, one having a dielectric constant in a range of about 10 to 120 can be used. In another example, the dielectric constant may be about 20 or more, about 30 or more, about 40 or more, about 50 or more, about 60 or more, or about 70 or more, or may be about 110 or less, about 100 or less, or about 90 or less. Such a solvent can be exemplified by water or an alcohol with 1 to 8 carbon atoms such as ethanol, butanol or methanol, DMSO (dimethyl sulfoxide), DMF (dimethylformamide) or NMP (N-methylpyrrolidinone), and the like, but is not limited thereto.

When a solvent is applied, it may be present in the slurry at a ratio of about 50 to 400 parts by weight relative to 100 parts by weight of the binder, but is not limited thereto. In another example, the ratio of the solvent may be about 60 parts by weight or more, about 70 parts by weight or more, about 80 parts by weight or more, about 90 parts by weight or more, about 100 parts by weight or more, about 110 parts by weight or more, about 120 parts by weight or more, about 130 parts by weight or more, about 140 parts by weight or more, about 150 parts by weight or more, about 160 parts by weight or more, about 170 parts by weight or more, about 180 parts by weight or more, or about 190 parts by weight or more, or may be about 350 parts by weight or less, 300 parts by weight or less, or 250 parts by weight or less, but is not limited thereto.

The slurry may also further comprise necessary known additives in addition to the above-mentioned components. However, the process of the present application may be performed using a slurry that does not include a foaming agent in known additives.

The method of forming the metal foam precursor using such a slurry is not particularly limited. In the field of manufacturing metal foams, various methods for forming metal foam precursors are known, and in the present application, all these methods can be applied. For example, the metal foam precursor can be formed by maintaining the slurry in a suitable template, or by coating the slurry in an appropriate manner.

When a metal foam is produced in the form of a film or sheet, and especially, a metal foam is produced in the form of a thin film or sheet, according to one example of the present application, it may be advantageous to apply a coating process. For example, after the slurry is coated on a suitable base material to form a precursor, the desired metal foam may be formed through a sintering process to be described below.

The shape of such a metal foam precursor is determined according to the desired metal foam and is not particularly limited. In one example, the metal foam precursor may be in the form of a film or sheet. For example, when the precursor is in the form of a film or sheet, the thickness may be 2,000 μm or less, 1,500 μm or less, 1,000 μm or less, 900 μm or less, 800 μm or less, 700 μm or less, 600 μm or less, 500 μm or less, 400 μm or less, 300 μm or less, 200 μm or less, 150 μm or less, about 100 μm or less, about 90 μm or less, about 80 μm or less, about 70 μm or less, about 60 μm or less, or about 55 μm or less. The metal foams have generally brittle characteristics due to their porous structural features, thereby being difficultly manufactured in the form of films or sheets, particularly thin films or sheets and having a problem of being easily broken even when they are manufactured. However, according to the method of the present application, it is possible to form a metal foam, in which pores are uniformly formed therein, while having a thin thickness, and having excellent mechanical characteristics.

Here, the lower limit of the thickness of the precursor is not particularly limited. For example, the precursor in the form of a film or sheet may also be about 5 μm or more, 10 μm or more, or about 15 μm or more.

If necessary, in the forming process of the metal foam precursor, a suitable drying process may also be performed. For example, the metal foam precursor may also be formed by molding the slurry by a method such as the above-described coating and then drying it for a certain time. The conditions of the drying are not particularly limited, which can be controlled, for example, at a level where the solvent contained in the slurry can be removed to a desired level. For example, the drying may be performed by maintaining the molded slurry at a temperature in a range of about 50° C. to 250° C., about 70° C. to 180° C., or about 90° C. to 150° C.

for an appropriate period of time. The drying time can also be selected from an appropriate range.

The electromagnetic-wave shielding sheet further comprises a polymer component present on the surface of the metal foam or in the interior of the metal foam, as described above, wherein the ratio (T/MT) of the total thickness (T) to the thickness (MT) of the metal foam in such an electromagnetic-wave shielding sheet may be 2.5 or less. In another example, the thickness ratio may be about 2 or less, about 1.9 or less, about 1.8 or less, about 1.7 or less, about 1.6 or less, 1.5 or less, 1.4 or less, 1.3 or less, 1.2 or less, 1.15 or less, or 1.1 or less. The lower limit of the thickness ratio is not particularly limited, but in one example, it may be about 1 or more, about 1.01 or more, about 1.02 or more, about 1.03 or more, about 1.04 or more or about 1.05 or more, about 1.06 or more, about 1.07 or more, about 1.08 or more, about 1.09 or more, about 1.1 or more, about 1.11 or more, about 1.12 or more, about 1.13 or more, about 1.14 or more, about 1.15 or more, about 1.16 or more, about 1.17 or more, about 1.18 or more, about 1.19 or more, about 1.2 or more, about 1.21 or more, about 1.22 or more, about 1.23 or more, about 1.24 or more, or about 1.25 or more. Under such a thickness ratio, it is possible to provide an electromagnetic-wave shielding sheet having excellent processability or impact resistance, and the like, while ensuring the desired thermal conductivity.

The kind of the polymer component included in the electromagnetic-wave shielding sheet is not particularly limited, which may be selected in consideration of, for example, processability, impact resistance, insulation properties or the like of the electromagnetic-wave shielding sheet. An example of the polymer component applicable in the present application may include one or more selected from the group consisting of known acrylic resins, silicone resins such as siloxane series, polyester resins such as PET (poly(ethylene terephthalate)), epoxy resins, olefin resins such as PP (polypropylene) or PE (polyethylene), urethane resins, polyamide resins, amino resins, and phenol resins, but is not limited thereto.

In one example, the ratio (MV/PV) of the volume (MV) of the metal foam and the volume (PV) of the polymer component contained in the electromagnetic-wave shielding sheet may be 10 or less. In another example, the ratio (MW/PV) may be 9 or less, 8 or less, 7 or less, 6 or less, 5 or less, 4 or less, 3 or less, 2 or less, 1 or less, or 0.5 or less or so. The lower limit of the volume ratio is not particularly limited, which may be, for example, about 0.1 or so. The volume ratio can be calculated through the weight of the polymer component and the metal foam, included in the electromagnetic-wave shielding sheet, and the density of the relevant components.

The electromagnetic-wave shielding sheet of the present application as above may exhibit high magnetic permeability. For example, in the above-described film form, the electromagnetic-wave shielding sheet may exhibit specific magnetic permeability of 100 or more at a thickness in a range of 10 μm to 1 cm and 100 kHz to 300 kHz. In another example, the specific magnetic permeability may be 110 or more, 120 or more, 130 or more, 140 or more, 150 or more, 160 or more, 170 or more, 180 or more, 190 or more, or 200 or more. In another example, the specific magnetic permeability may be about 1,000 or less, 900 or less, 800 or less, 700 or less, 600 or less, 500 or less, 400 or less, or 300 or less or so.

The present application also relates to a method for producing an electromagnetic-wave shielding sheet in such a form.

In addition, the electromagnetic-wave shielding sheet may be produced through a step of curing a curable polymer composition in a state where the polymer composition is present on the surface of or inside the metal foam.

The details of the metal foams applied in the above method are as described above, and specific matters of the electromagnetic-wave shielding sheet to be manufactured can also follow the above-described contents.

Here, the applied polymer composition is not particularly limited as long as it can form the above-mentioned polymer component through curing or the like, and such polymer components are variously known in the art.

That is, for example, the electromagnetic-wave shielding sheet may be manufactured by performing the curing through a known method using a material having appropriate viscosity among known components.

Advantageous Effects

The present application relates to a wireless charging device and a wireless charging system comprising the same. According to the present application, it is possible to provide a wireless charging device having high magnetic permeability and improved electromagnetic-wave shielding performance and wireless charging efficiency.

BEST MODE

Hereinafter, the present application will be described in detail by way of examples and comparative examples, but the scope of the present application is not limited to the following examples.

EXAMPLE 1

As a metal foam, a metal foam, made of an alloy of iron and nickel (Fe/Ni=20 wt %/80 wt %), having a porosity of about 75% and a thickness of about 80 μm (average pore size of 6 μm) was used. An epoxy resin having a viscosity of about 900 cP was applied to the metal foam, and an excessive amount of the composition was removed using a film applicator so that the final electromagnetic-wave shielding sheet had a thickness of about 120 μm or so. Subsequently, the material was held in an oven at about 120° C. for about 1 hour and cured to produce an electromagnetic-wave shielding sheet in the form of a film. The specific magnetic permeability of the electromagnetic-wave shielding sheet was 200 or more (100 to 300 kHz). The electromagnetic-wave shielding sheet was disposed between a receiving part coil and a battery pack to produce a wireless charging device. It can be confirmed that when the magnetic permeability is high, the electromagnetic-wave shielding performance and the wireless charging efficiency are increased.

EXAMPLE 2

As a metal foam, a metal foam, made of an alloy of iron and nickel (Fe/Ni=20 wt %/80 wt %), having a porosity of about 75% and a thickness of about 80 μm (average pore size of 6 um) was used. A resin of siloxane series was applied to the metal foam, and an excessive amount of the composition was removed using a film applicator so that the final electromagnetic-wave shielding sheet had a thickness of about 120 μm or so. Subsequently, the material was held in an oven at about 120° C. for about 1 hour and cured to produce an electromagnetic-wave shielding sheet in the form of a film. The magnetic permeability of the electromagnetic-wave shielding sheet was 200 or more (100 to 300 kHz). The electromagnetic-wave shielding sheet was disposed between a receiving part coil and a battery pack to produce a wireless charging device.

EXAMPLE 3

As a metal foam, a metal foam, made of an alloy of iron and nickel (Fe/Ni=20 wt %/80 wt %), having a porosity of about 75% and a thickness of about 80 μm (average pore size of 6 μm) was used. A resin of acrylate series was applied to the metal foam, and an excessive amount of the composition was removed using a film applicator so that the final electromagnetic-wave shielding sheet had a thickness of about 120 μm or so. Subsequently, the material was held in an oven at about 120° C. for about 1 hour and cured to produce an electromagnetic-wave shielding sheet in the form of a film. The specific magnetic permeability of the electromagnetic-wave shielding sheet was 190 or more (100 to 300 kHz). The electromagnetic-wave shielding sheet was disposed between a receiving part coil and a battery pack to produce a wireless charging device.

EXAMPLE 4

As a metal foam, a metal foam, made of an alloy of iron and nickel (Fe/Ni=20 wt %/80 wt %), having a porosity of about 75% and a thickness of about 80 μm (average pore size of 6 μm) was used. A resin of polypropylene series was applied to the metal foam, and an excessive amount of the composition was removed using a film applicator so that the final electromagnetic-wave shielding sheet had a thickness of about 120 μm or so. Subsequently, the material was cured to produce an electromagnetic-wave shielding sheet in the form of a film. The specific magnetic permeability of the electromagnetic-wave shielding sheet was 190 or more (100 to 300 kHz). The electromagnetic-wave shielding sheet was disposed between a receiving part coil and a battery pack to produce a wireless charging device.

EXAMPLE 5

As a metal foam, a metal foam, made of an alloy of iron, nickel and molybdenum (Fe/Ni/Mo=15 wt %/80 wt %/5 wt %), having a porosity of about 72% and a thickness of about 80 μm (average pore size of 5 μm) was used. An epoxy resin was applied to the metal foam, and an excessive amount of the composition was removed using a film applicator so that the final electromagnetic-wave shielding sheet had a thickness of about 110 μm or so. Subsequently, the material was cured to produce an electromagnetic-wave shielding sheet in the form of a film. The specific magnetic permeability of the electromagnetic-wave shielding sheet was 200 or more (100 to 300 kHz). The electromagnetic-wave shielding sheet was disposed between a receiving part coil and a battery pack to produce a wireless charging device.

EXAMPLE 6

As a metal foam, a metal foam, made of an alloy of iron, nickel and molybdenum (Fe/Ni/Mo=15 wt %/80 wt %/5 wt %), having a porosity of about 72% and a thickness of about 80 μm (average pore size of 5 μm) was used. A siloxane resin was applied to the metal foam, and an excessive amount of the composition was removed using a film applicator so that the final electromagnetic-wave shielding sheet had a thickness of about 110 μm or so. Subsequently, the material was cured to produce an electromagnetic-wave shielding sheet in the form of a film. The specific magnetic permeability of the electromagnetic-wave shielding sheet was 200 or more (100 to 300 kHz). The electromagnetic-wave shielding sheet was disposed between a receiving part coil and a battery pack to produce a wireless charging device.

EXAMPLE 7

As a metal foam, a metal foam, made of an alloy of iron, aluminum and silicon (Fe/Al/Si=85 wt %/6 wt %/9 wt %), having a porosity of about 70% and a thickness of about 80 μm (average pore size of 4 μm) was used. An epoxy resin was applied to the metal foam, and an excessive amount of the composition was removed using a film applicator so that the final electromagnetic-wave shielding sheet had a thickness of about 100 μm or so. Subsequently, the material was cured to produce an electromagnetic-wave shielding sheet in the form of a film. The magnetic permeability of the electromagnetic-wave shielding sheet was 150 or more (100 to 300 kHz). The electromagnetic-wave shielding sheet was disposed between a receiving part coil and a battery pack to produce a wireless charging device.

EXAMPLE 8

As a metal foam, a metal foam, made of an alloy of iron, silicon and boron (Fe/Si/B=75 wt %/15 wt %/10 wt %), having a porosity of about 67% and a thickness of about 80 μm (average pore size of 3 μm) was used. An epoxy resin was applied to the metal foam, and an excessive amount of the composition was removed using a film applicator so that the final electromagnetic-wave shielding sheet had a thickness of about 120 μm or so. Subsequently, the material was cured to produce an electromagnetic-wave shielding sheet in the form of a film. The specific magnetic permeability of the electromagnetic-wave shielding sheet was 120 or more (100 to 300 kHz). The electromagnetic-wave shielding sheet was disposed between a receiving part coil and a battery pack to produce a wireless charging device.

EXAMPLE 9

As a metal foam, a metal foam, made of an alloy of iron, silicon, boron, niobium and copper (Fe/Si/B/Nb/Cu=74 wt %/13 wt %/9 wt %/3 wt %/1 wt %), having a porosity of about 61% and a thickness of about 80 μm (average pore size of 2 μm) was used. An epoxy resin was applied to the metal foam, and an excessive amount of the composition was removed using a film applicator so that the final electromagnetic-wave shielding sheet had a thickness of about 100 μm or so. Subsequently, the material was cured to produce an electromagnetic-wave shielding sheet in the form of a film. The specific magnetic permeability of the electromagnetic-wave shielding sheet was 170 or more (100 to 300 kHz). The electromagnetic-wave shielding sheet was disposed between a receiving part coil and a battery pack to produce a wireless charging device.

COMPARATIVE EXAMPLE 1

As a metal foam, a metal foam, made of copper, having a porosity of about 65% and a thickness of about 80 μm was used. A resin of siloxane series was applied to the metal foam, and an excessive amount of the composition was removed using a film applicator so that the final electromagnetic-wave shielding sheet had a thickness of about 120 μm or so. Subsequently, the material was cured to produce an electromagnetic-wave shielding sheet in the form of a film. The specific magnetic permeability of the electromagnetic-wave shielding sheet was 50 or less (100 to 300 kHz). The electromagnetic-wave shielding sheet was disposed between a receiving part coil and a battery pack to produce a wireless charging device.

COMPARATIVE EXAMPLE 2

As a metal foam, a metal foam, made of nickel, having a porosity of about 70% and a thickness of about 80 μm was used. A resin of siloxane series was applied to the metal foam, and an excessive amount of the composition was removed using a film applicator so that the final electromagnetic-wave shielding sheet had a thickness of about 120 μm or so. Subsequently, the material was cured to produce an electromagnetic-wave shielding sheet in the form of a film. The specific magnetic permeability of the electromagnetic-wave shielding sheet was 50 or less (100 to 300 kHz). The electromagnetic-wave shielding sheet was disposed between a receiving part coil and a battery pack to produce a wireless charging device.

COMPARATIVE EXAMPLE 3

An alloy filler of iron, aluminum and silicon (Fe/Al/Si=85 wt %/6 wt %/9 wt %) as a soft magnetic metal filler was mixed with a polypropylene resin, and then molded in the form of a film having a thickness of about 120 μm or so using a film applicator and cured to produce an electromagnetic-wave shielding sheet in the form of a film. The specific magnetic permeability of the electromagnetic-wave shielding sheet was 90 or so (100 to 300 kHz). The electromagnetic-wave shielding sheet was disposed between a receiving part coil and a battery pack to produce a wireless charging device.

COMPARATIVE EXAMPLE 4

A copper foam was produced by plating copper on a polyurethane foam, and then baking it at high temperature to remove the polyurethane. The produced copper foam had an average pore size of 400 μm, a porosity of 95% or more, and a thickness of 1.6 mm.

A resin of siloxane series was applied to the metal foam, and an excessive amount of the composition was removed using a film applicator so that the final electromagnetic-wave shielding sheet had a thickness of about 1.8 mm or so. Subsequently, the material was cured to produce an electromagnetic-wave shielding sheet in the form of a film. The specific magnetic permeability of the electromagnetic-wave shielding sheet was about 10 to 20 or so (100 to 300 kHz). The electromagnetic-wave shielding sheet was disposed between a receiving part coil and a battery pack to produce a wireless charging device.

What is claimed is:

1. A wireless charging device comprising:
   a receiving part coil; and
   an electromagnetic-wave shielding sheet on the receiving part coil,
   wherein the electromagnetic-wave shielding sheet has a specific magnetic permeability of 100 or greater from 100 kHz to 300 kHz and comprises a metal foam including a soft magnetic metal component, wherein the metal foam has a porosity of 10% or greater.

2. The wireless charging device according to claim 1; wherein the metal foam is in the form of a film or sheet.

3. The wireless charging device according to claim 1, wherein the metal foam is in the form of a film or sheet having a thickness in a range of 5 μm to 1,000 μm.

4. The wireless charging device according to claim 1, wherein at least 85% of pores in the metal foam have a pore size of 10 μm or less.

5. The wireless charging device according to claim 1, wherein at least 65% of pores in the metal foam have a pore size of 5 μm or less.

6. The wireless charging device according to claim 1, wherein the soft magnetic metal component comprises an Fe/Ni alloy, an Fe/Ni/Mo alloy, an Fe/Al/Si alloy, an Fe/Si/B alloy, an Fe/Si/Nb alloy, an Fe/Si/Cu alloy or an Fe/Si/B/Nb/Cu alloy.

7. The wireless charging device according to claim 1, wherein the metal foam comprises a first metal component and a second metal component having an electrical conductivity different than that of the first metal component.

8. The wireless charging device according to claim 7, wherein the second metal component has the electrical conductivity lower than that of the first metal component and is included in an amount of from 0.01 to 30 wt % in the metal foam.

9. The wireless charging device according to claim 7, wherein the second metal component has the electrical conductivity lower than that of the first metal component and comprises Mo, Si, B, Cr, Co or Nb.

10. The wireless charging device according to claim 7, wherein the second metal component has the electrical conductivity lower than that of the first metal component and is included in an amount of 0.01 to 50 parts by weight per 100 parts by weight of the first metal component.

11. The wireless charging device according to claim 1, further comprising a polymer component present on a surface of the metal foam or inside the metal foam.

12. The wireless charging device according to claim 11, wherein the polymer component forms a surface layer on the surface of the metal foam.

13. The wireless charging device according to claim 11, wherein the polymer component comprises one or more selected from the group consisting of an acrylic resin, a silicone resin, an epoxy resin, an olefin resin, a polyester resin, a polyamide resin, a urethane resin, an amino resin and a phenol resin.

14. The wireless charging device according to claim 11, wherein a ratio (MV/PV) of a volume (MV) of the metal foam to a volume (PV) of the polymer component is 10 or less.

15. The wireless charging device according to claim 11, wherein a ratio (T/NIT) of a thickness (T) of the electromagnetic-wave shielding sheet to a thickness (MT) of the metal foam is at most 2.5.

16. The wireless charging device according to claim 1, further comprising a conductive material on the electromagnetic-wave shielding sheet.

17. A wireless charging system comprising:
   a wireless charger including a transmitting part coil; and
   the wireless charging device according to claim 1 on the wireless charger.

18. The wireless charging system according to claim 17, further comprising a conductive material on the electromagnetic-wave shielding sheet,
   wherein the electromagnetic-wave shielding sheet is between the transmitting part coil and the conductive material.

19. The wireless charging device of claim 1, wherein the foam has a porosity of 55% or more.

* * * * *